United States Patent [19]
Gambon

[11] 3,986,572
[45] Oct. 19, 1976

[54] INSTALLATION FOR GIVING DRIVING INSTRUCTIONS

[76] Inventor: Albert Gambon, Kirchfeldstrasse 18, 3600 Thun, Switzerland

[22] Filed: Aug. 12, 1974

[21] Appl. No.: 496,825

[30] Foreign Application Priority Data
Aug. 16, 1973 Switzerland................ 11809/73

[52] U.S. Cl................................ 180/2; 105/61; 180/60; 180/65 R
[51] Int. Cl.².............................. B60L 9/12
[58] Field of Search ........... 180/65 R, 65 F, 65 A, 180/60, 2, 57, 70; 105/61

[56] References Cited
UNITED STATES PATENTS

| | | | |
|---|---|---|---|
| 1,059,562 | 4/1913 | Pfouts............................ | 180/57 |
| 1,139,674 | 5/1915 | Gruenfeldt..................... | 180/57 |
| 1,179,407 | 4/1916 | Decker........................... | 180/65 R |
| 1,275,201 | 8/1918 | Beach............................ | 180/65 R X |
| 1,546,708 | 7/1925 | Booth............................. | 180/70 R |
| 3,190,387 | 6/1965 | Dow............................... | 180/65 R |
| 3,412,819 | 11/1968 | Kruckman..................... | 180/2 |
| 3,628,621 | 12/1971 | Lee................................ | 180/65 R |
| 3,716,767 | 2/1973 | Kuriyama et al.............. | 180/65 R |
| 3,792,327 | 2/1974 | Waldorf......................... | 180/65 R X |

FOREIGN PATENTS OR APPLICATIONS

1,074,443  7/1967  United Kingdom............. 180/65 R

Primary Examiner—M. H. Wood, Jr.
Assistant Examiner—Milton L. Smith
Attorney, Agent, or Firm—Werner W. Kleeman

[57] ABSTRACT

An installation for giving driving instructions, comprising a passenger vehicle equipped with a gear shift, an electric motor and a mechanism for supplying electrical energy. Between the gear shift and the electric motor there is provided a releasable clutch, and there is further provided an electronic control mechanism for the electric motor and which control mechanism is responsive to the position of a foot pedal.

3 Claims, 3 Drawing Figures

INSTALLATION FOR GIVING DRIVING INSTRUCTIONS

BACKGROUND OF THE INVENTION

The present invention relates to a new and improved construction of installation or apparatus for giving driving instructions and which is of the type incorporating a passenger vehicle or the like equipped with an electric motor and a gear shift and mechanism for furnishing electrical energy.

Heretofore it was conventional practice for a driving student or learner, following the theoretical instruction, to directly begin the practical driving instruction in a passenger vehicle or car. However, it oftentimes happened that the passenger vehicle used for this purpose became involved in an accident or was otherwise damaged owing to the insufficient practical driving experience of the student. Therefore it has already been proposed to instruct the student during the first few practical lessons by means of a simulator. The practical value of non-complex simulators is extremely limited because the differences between the simulated driving conditions experienced with such simulator and those encountered with an actual automobile are much too great. Simulators which are capable of simulating the most important conditions which arise in practice are extremely expensive. Furthermore, no matter how good the simulator it can never really transmit to the student driver a real feeling that he or she is driving a car.

SUMMARY OF THE INVENTION

Hence, it is a primary object of the present invention to provide an improved installation for giving driving lessons in a manner not associated with the aforementioned drawbacks and shortcomings of the prior art proposals.

Another and more specific object of the present invention aims at the provision of an installation which enables giving practical driving instructions to the driving student at least during the early stages of his or her instructions in such a way that the student can receive practical driving instructions by means of a vehicle in a closed or limited area, especially during the first few driving lessons, and can carry out practice in maneuvering the vehicle.

Still a further significant object of the present invention aims at the provision of an improved construction of apparatus for giving lessons to a student, particularly during the early stages of his or her driving experience, in a manner simulating the actual driving conditions encountered in a passenger vehicle, and which apparatus is relatively simple in construction and design, easy to use, and provides for more practical driving experience for the student than when using the prior art proposed simulators.

Now in order to implement these and still further objects of the invention, which will become more readily apparent as the description proceeds, the installation of this development is manifested by the features that a releasable clutch or coupling is provided between the gear shift and the electric motor, and there is further provided an electronic control mechanism for the electric motor and which control mechanism is responsive to the position of a foot pedal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
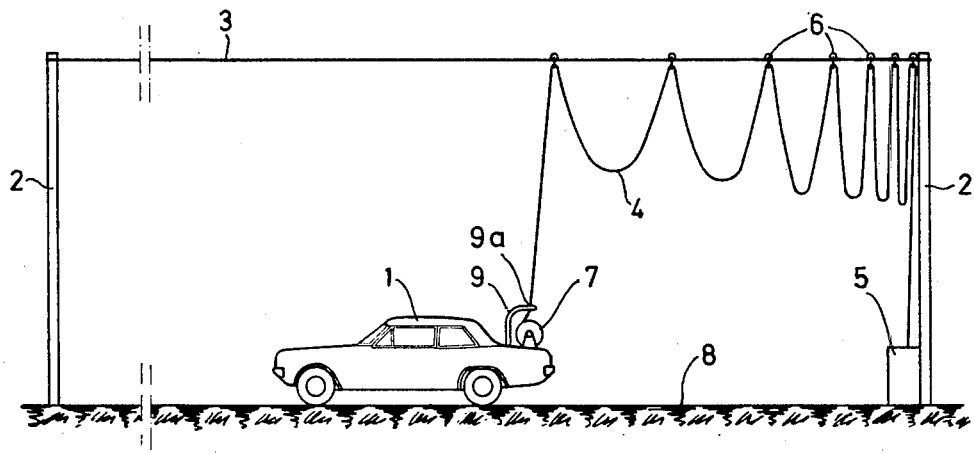
FIG. 1 schematically illustrates an installation for giving driving instructions as contemplated by the invention.

Describing now the drawings, the exemplary embodiment of installation or apparatus for giving driving instructions as depicted in FIG. 1 will be understood to encompass a passenger vehicle or car 1 which, instead of possessing an internal combustion engine, has an electric motor 17 which will be discussed more fully hereinafter. Further, the installation of this development will be understood to additionally comprise two supporting uprights or poles 2 between which there is spanned a support or supporting cable 3, and a power supply cable 4 which is suspended from the support cable 3 for the delivery of electrical energy from a junction box or cabinet 5 to the passenger vehicle 1. The supply cable 4 is suspended from the support cable 3 through the agency of a number of traveling rollers 6 so that the passenger vehicle or car 1 can move in the lengthwise direction of the support cable 3.

In order to render possible movement of the passenger car in a direction transverse to the support cable 3 a cable roll or roller 7 is provided on the passenger vehicle 1. Part of the supply cable 4 can be paid-off this cable roller 3 against the action of a spring force in order to increase the freedom of movement of the passenger vehicle. When such vehicle moves closer to the support cable 3 then the paid-off portion of the supply cable 4 is automatically again wound-up, so that the freedom of movement of the passenger vehicle 1 is not unnecessarily hindered by the supply cable 4. The length of the support cable 3 and the portion of the supply cable 4 wound-up on to the cable roller 7 limits or defines the area 8 in which there can be carried out the process of learning to drive. An arm or arm member 9 which is attached to the passenger vehicle 1 and equipped with a guide opening 9a serves for the orderly winding-up of the portion of the supply cable 4 which has been wound-off the cable roller or roll 7.

Figure 2:
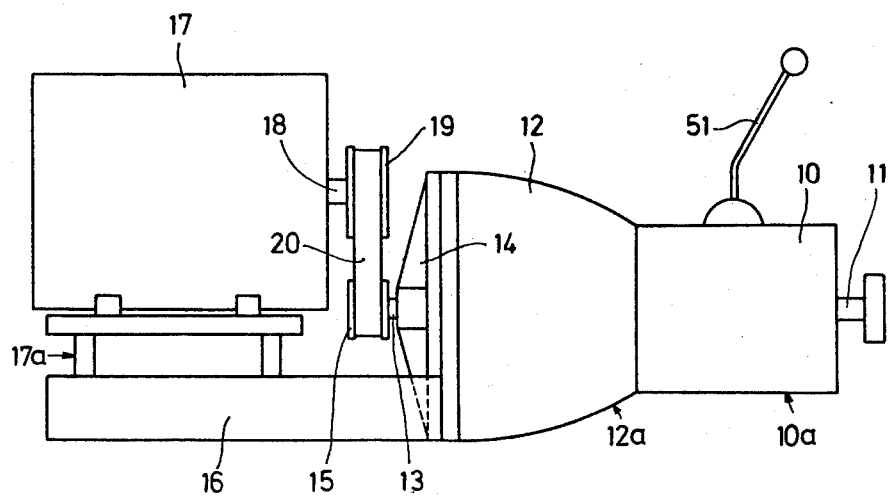
FIG. 2 illustrates the principal arrangement of the driving assembly or unit of the passenger vehicle or car which is part of the installation depicted in FIG. 1.

The passenger car 1 is preferably a conventional vehicle with the difference that it possesses an electric motor 17 instead of the usual internal combustion engine. FIG. 2 basically portrays in side view the drive assembly or unit of the passenger vehicle 1. From the gearbox shift 10 there protrudes part of a shaft 11 which is connected through the agency of a non-illustrated arrangement of a conventional Cardan shaft and a differential transmission with the drive wheels of the passenger vehicle 1. A disk coupling or clutch, generally referenced by numeral 12a, is accommodated in a clutch housing 12 which is rigidly connected with the housing 10a of the gear shift or transmission 10, and of which disk clutch 12a there is only readily visible part of a drive shaft 13. This drive shaft 13 is mounted in a bearing star or bearing arrangement 14 which is detachably secured to the clutch housing instead of the not present engine block. At the free end of the drive shaft 13 there is mounted a belt pulley 15.

Continuing, an auxiliary frame 16 is attached to the clutch housing 12 and on this frame there is carried by means of the supporting arrangement 17a the electric motor 17. At the free end of the motor shaft 18 there is mounted a further belt pulley 19. The force or power transmission from the electric motor 17 to the drive shaft 13 of the clutch 12a preferably occurs through the agency of an endless belt 20 provided on its inner surface with teeth. Instead of a single toothed belt it would be equally possible to use a number of V-shaped belts or an equivalent structure. Of course, the power transmission can also take place by other power transmitting elements, such as a sprocket or gear drive.

The above-mentioned power transmission through the agency of the single belt 20 is chosen for the reason that the exchange of the linings of the not further illustrated clutch 12a and which linings, as experience has shown are subjected to increased wear, can be carried out in an extremely simple manner. Furthermore, the arrangement is undertaken such that for the purpose of replacing the aforementioned linings it is only necessary to disconnect the bearing arrangement or bearing means 14, i.e. for this purpose it is unnecessary to remove the electric motor 17.

Figure 3:
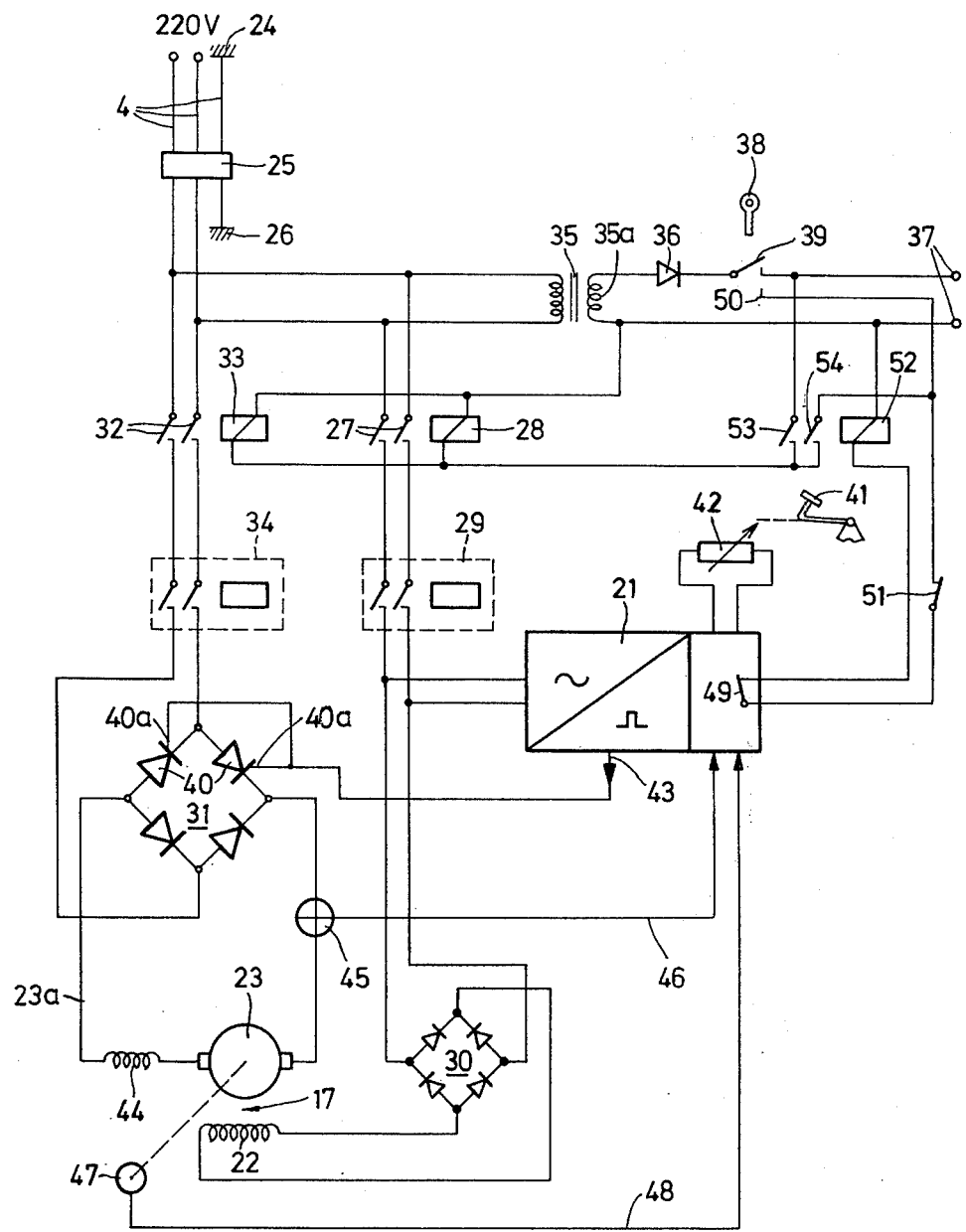
FIG. 3 is a block circuit diagram of an electronic drive of the passenger car which is part of the installation depicted in FIG. 1.

In order to be able to simulate a behavior of the electric motor 17 which is as close as realistically possible to that of an internal combustion engine there is provided an electric or electronic control mechanism 21, the function of which will be considered more fully hereinafter in conjunction with FIG. 3. The electric motor 17 is preferably a direct-current motor having a field winding 22 and an armature winding 23.

The supply cable 4, by means of which there is furnished the electrical energy to the passenger vehicle 1, has three wires or conductors, two of which serve to connect one phase of the alternating-current power network. The third wire or conductor is coupled with ground 24 and is connected through the agency of a plug connector or terminal 25 with the chassis 26 of the passenger vehicle 1. The network voltage is delivered via the contacts 27 of a first relay 28 and an overload cut-off device 29 to a first rectifier arrangement 30 which furnishes the field winding 22 with direct-current. A second rectifier arrangement 31 likewise has delivered thereto the network voltage through the agency of the contacts 32 of a second relay 33 and via an overload cut-off device 34, and which second rectifier arrangement 31 supplies the armature winding 23 of the electric motor 17. Additionally, it is to be recognized that the network voltage is directly delivered to a transformer 35. At the secondary winding 35a of the transformer 35 there is connected a diode 36. At the terminals 37 there is connected the non-illustrated power supply network of the passenger vehicle. At the terminals 37 there appears a direct-current voltage of, for instance, 12 volts as soon as the switch 39 has been closed after it has been actuated by means of an ignition key 38 or the like. The ignition key 38, as is conventional for motor vehicles, can assume an off-position, an intermediate operating position or a starting position. If the ignition key 38 is shifted from the off-position into the operating position, then as a result thereof only the vehicle power supply is turned on. If the ignition key 38 is further turned into the starting position then the drag or trailing contact 50 likewise comes into contact with the contact of the switch 39, so that through the agency of a normally closed contact 51 and a normally closed contact 49 located in the control mechanism 21 there is energized an auxiliary relay 52. By means of a first normally open contact 53 of the auxiliary relay 52 the relays 28 and 33 are energized. By means of a second normally open contact 54 of the auxiliary relay 52 the latter assumes a self-holding condition as long as the switch 39 or one of the normally closed contacts 49 or 51 respectively is not opened.

If the ignition key 38 is briefly brought into the starting position then the relays 28 and 33 are energized. The field winding 22 of the electric motor 17 is energized. The second rectifier arrangement 31 contains two controllable semi-conductors 40, the control inputs 40a of which are electrically coupled with the control mechanism 21. As long as these control inputs do not have delivered thereto any control signals then the second rectifier arrangement 31 does not deliver any direct-current and the armature current circuit 239 of the electric motor 17 is without current.

The function of the control mechanism 21 is to produce control signals for the semi-conductors 40 of the second rectifier arrangement 31 and the generation of such control signals is dependent upon the position of a foot pedal 41 or equivalent structure which serves as a gas pedal. For this purpose the foot pedal 41 is mechanically coupled with a variable resistor 42.

At the signal output 43 of the control mechanism 21 there appear only short pulses when the foot pedal 41 is not actuated. The resistor 42 which is mechanically coupled with the foot pedal 41 influences the control mechanism 21 in the manner that there appears at the output 43 for each half-wave of the network voltage which is used as the power supply a pulse which becomes longer as a function of time the greater that the foot pedal 41 is depressed, and wherein the boundary values can be in the order of between 0 and 20 ms when the frequency of the network voltage amounts to 50 Hz. The controllable semi-conductors 40 are blocked or partially or completely conductive as a function of the position of the foot pedal 41 during the entire duration of the half-wave periods of the supply voltage, so that the armature winding 23 of the electric motor 17 has delivered thereto either none of, part of or the complete energy supply. With the foot pedal 41 it is therefore possible to continuously vary the rotational moment or torque of the electric motor 17, similar to the rotational moment of an internal combustion engine with the gas pedal of the vehicle. It is preferable to adjust the variable resistor 42 such that when the foot pedal 41 is not actuated the electric motor 17 rotates at a lower rotational speed corresponding to the idling mode of an internal combustion engine.

Apart from a choke 44 for smoothing the pulse-like direct-current in the armature current circuit 23a of the electric motor 17 there is also provided a current monitor 45 in such armature current circuit. The signal produced by the current monitor 45 is proportional to the armature current and is delivered via a conductor or line 46 to the control mechanism 21. When this signal exceeds a reference or set value then the production of pulses appearing at the output 43 of the control mechanism 21 is influenced in such a way that there is prevented any further increase of the armature current in order to protect the electric motor 17.

A tacho-generator 47 is connected for rotation with the drive shaft of the electric motor 17 and via a conductor 48 delivers a signal to the control mechanism 21 whenever the electric motor 17 rotates. If the electric motor 17 is at standstill then the control mechanism 21 does not have delivered thereto any signal via the conductor 48. In the control mechanism 21 there is provided a non-illustrated current circuit which acts upon the above-mentioned normally closed contact 49 and briefly opens such normally closed contact 49 each time after the disappearance or non-presence of the signal produced by the tacho-generator 47.

In this way there is achieved the result that during each standstill or almost standstill of the electric motor 17 the auxiliary relay 52 will be de-energized, so that the energization of the relays 28 and 33 is turned-off and all of the drive current circuits are without current. In this manner there is simulated the so-called "stalling", i.e. the overloading of an internal combustion engine. The blocking of the electric motor 17 can occur, for instance, when driving against a hindrance or when attempting to start the engine with the gear shift in gear and the hand brake pulled.

The above-mentioned normally closed contact 51 is mechanically connected with the engine hood-lock mechanism and opens when such is unlocked. Therefore the hood of the engine can be subsequently opened without any danger because the entire drive current circuit is now without voltage.

The above-described installation can be operated in an open area or in a hall or otherwise. With this installation it is possible to give to the driving student the initial driving instructions in a form which closely approximates reality, and furthermore, something which is very important, it is possible for the driving student to carry out practice in maneuvering of unlimited duration. There is no danger that the motor of the vehicle will become damaged. When giving driving instructions with a normal passenger vehicle equipped with an internal combustion engine the duration of the practice in maneuvering the vehicle, and which constitutes a major part of the driving instruction, must be limited to short time intervals because the internal combustion engine very often becomes overheated or overloaded if driving maneuvers are attempted to be carried over longer periods of time. It is this drawback that is completely eliminated with the above-described installation. Furthermore, there are not produced any noxious exhaust gases and practically no noise, something which is important from the standpoint of the protection of the environment.

In order to facilitate the replacement of the clutch linings which are exposed to increased wear during the maneuvering exercises the connection between the drive shaft 13 of the clutch 12a and the electric motor 17 is carried out such that the clutch is accessible without having to disassemble the motor or the transmission. In this way the maintainance costs are also held to a minimum. The costs for giving the driving instructions can be equally therefore held to a reasonable amount.

While there is shown and described present preferred embodiments of the invention, it is to be distinctly understood that the invention is not limited thereto, but may be otherwise variously embodied and practiced within the scope of the following claims.

What is claimed is:

1. An installation for giving driving instructions within a defined area, comprising a passenger vehicle movable at least over part of the defined area, an electric motor, gear shift means and an acceleration foot pedal provided for the passenger vehicle, said electric motor having a motor shaft, clutch means provided between the gear shift means and the electric motor, the clutch means having a clutch drive shaft, belt drive means for the transmission of drive power from the electric motor to the clutch means, said belt drive means incorporating a pair of belt pulleys, one of the belt pulleys being mounted upon the shaft of the electric motor, the other of the belt pulleys being mounted upon the clutch drive shaft, an electronic control mechanism operatively connected in circuit with said electric motor and operated in response to actuation of the acceleration foot pedal for the electrical drive of said electric motor in order to carry out an infinite speed regulation thereof, a current supply network for the electric motor, an extendable cable-supply means for operatively connecting the current supply network with the electric motor of the vehicle, said electric motor comprising a direct-current motor having a field winding and an armature winding, a first rectifier arrangement with which there is electrically connected in circuit said field winding, a second controllable rectifier arrangement with which there is electrically connected in circuit said armature winding, control relay means including relay contact means, both of said rectifier arrangements being connected in circuit with said control relay means, switch means, said control relay means including excitation current circuit means operatively electrically connected with said switch means which can be activated by means of an ignition key, said second controllable rectifier arrangement being further connected in circuit with said electronic control mechanism for receiving a control voltage from said electronic control mechanism, said armature winding being arranged in an armature current circuit of said electric motor, and a current monitor means connected in circuit with said armature current circuit for producing an output proportional to the armature current, the output of said current monitor means being connected to said electronic control mechanism for preventing the further increase of armature current when said output exceeds a predetermined magnitude.

2. The installation as defined in claim 1, wherein the clutch means includes a clutch housing, a bearing arrangement releasably connected with said clutch housing, the drive shaft of the clutch means provided with the belt pulley being mounted in the releasable bearing arrangement.

3. The installation as defined in claim 1, further including tacho-generator means rotatably connected with the drive shaft of the electric motor, said tacho-generator means having an output delivering an output voltage via a conductor to the electronic control mechanism, said electronic control mechanism including a current circuit having a normally closed contact means connected in circuit with said control relay means, said current circuit of said electronic control mechanism being responsive to the output voltage of the tacho-generator means and briefly opening said normally closed contact means when the output voltage of the tacho-generator means drops below a predetermined value indicative of a minimum rotational speed of the electric motor in order to interrupt the supply of energy to the electric motor via said control relay means to thereby simulate an overload condition and self-holding relay means for allowing renewed switching-in of the control relay means and electric motor while said switch means is activated by said ignition key.

* * * * *